US012567548B2

(12) United States Patent
Chapel et al.

(10) Patent No.: US 12,567,548 B2
(45) **Date of Patent: *Mar. 3, 2026**

(54) ACCELERATED MOTION RELAY

(71) Applicant: Zonit Structured Solutions, LLC, Boulder, CO (US)

(72) Inventors: Steve Chapel, Iliff, CO (US); William Pachoud, Boulder, CO (US)

(73) Assignee: Zonit Structured Solutions, LLC, Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 18/229,052

(22) Filed: Aug. 1, 2023

(65) Prior Publication Data

US 2024/0222054 A1 Jul. 4, 2024

Related U.S. Application Data

(63) Continuation of application No. 17/397,283, filed on Aug. 9, 2021, now Pat. No. 11,721,505, which is a continuation of application No. 16/438,195, filed on Jun. 11, 2019, now Pat. No. 11,211,216, which is a continuation of application No. 15/452,917, filed on Mar. 8, 2017, now Pat. No. 10,361,050, which is a continuation of application No. 14/217,159, filed on Mar. 17, 2014, now Pat. No. 9,646,789.

(Continued)

(51) Int. Cl.

| | |
|---|---|
| ***H01H 47/02*** | (2006.01) |
| ***H01H 50/24*** | (2006.01) |
| ***H01H 50/42*** | (2006.01) |
| ***H01H 50/60*** | (2006.01) |
| *H01H 47/00* | (2006.01) |
| *H01H 47/22* | (2006.01) |
| *H01H 50/16* | (2006.01) |
| *H01H 50/18* | (2006.01) |

(52) U.S. Cl.

CPC ............ *H01H 47/02* (2013.01); *H01H 50/24* (2013.01); *H01H 50/42* (2013.01); *H01H 50/60* (2013.01); *H01H 47/00* (2013.01); *H01H 47/22* (2013.01); *H01H 50/16* (2013.01); *H01H 50/18* (2013.01)

(58) Field of Classification Search

CPC ........ H01H 47/22; H01H 47/02; H01H 50/16; H01H 50/18; H01H 50/22; H01H 50/44; H01H 51/065; H01H 47/00; H01H 50/34; H01F 7/122; H01F 7/1646; H01F 7/18

USPC ........................................ 361/139, 144, 160

See application file for complete search history.

(56) References Cited

U.S. PATENT DOCUMENTS 2,016,672 A 10/1935 Godsey
2,133,511 A 10/1938 Heintz (Continued)

*Primary Examiner* — Danny Nguyen

(74) *Attorney, Agent, or Firm* — Davis Graham & Stubbs LLP

(57) ABSTRACT

An electrical relay (2) includes an electromagnetic drive system for providing bi-directional drive. The electrical relay (2) includes a first a coil (212) and a second coil (213). A current is supplied to the coils (212) and (213) in opposite directions. The two coils (212) and (213) can be used to accelerate the armature in either direction in relation to the two contacts. This can be used to drive the armature to either one of the contacts and to accelerate and decelerate the armature during a single transit. In the latter regard, the armature can be accelerated and decelerated to shorten the transit time, reduce bounce, reduce wear on the contacts, and allow for different contact material options.

32 Claims, 10 Drawing Sheets

Related U.S. Application Data

(60) Provisional application No. 61/792,738, filed on Mar. 15, 2013.

(56) References Cited

U.S. PATENT DOCUMENTS

| | | | |
|---|---|---|---|
| 2,196,883 | A | 4/1940 | Winter |
| 2,743,151 | A | 4/1956 | Hunt et al. |
| 3,613,036 | A | 10/1971 | Kurtz |
| 3,616,036 | A | 10/1971 | Anderson |
| 3,684,986 | A | 8/1972 | Nagamoto |
| 4,418,289 | A | 11/1983 | Mortensen |
| 4,483,512 | A | 11/1984 | Drapeau |
| 4,998,082 | A | 3/1991 | Duimstra |
| 5,255,152 | A | 10/1993 | Estes, III |
| 5,325,079 | A | 6/1994 | Aharonian |
| 6,061,225 | A | 5/2000 | Nojima |
| 6,078,246 | A | 6/2000 | Davis et al. |
| 6,315,264 | B1 | 11/2001 | Baker |
| 7,021,603 | B2 | 4/2006 | Wygnaski |
| 8,004,115 | B2 | 8/2011 | Chapel et al. |
| 8,373,524 | B1 | 2/2013 | Villarin |
| 8,502,627 | B1 | 8/2013 | Ahmad et al. |
| 8,907,520 | B2 | 12/2014 | Chapel et al. |
| 9,406,467 | B2 | 8/2016 | Avery |
| 9,646,789 | B2 | 5/2017 | Chapel et al. |
| 10,361,050 | B2 | 7/2019 | Chapel et al. |
| 11,211,216 | B2 | 12/2021 | Chapel et al. |
| 2009/0020091 | A1 | 1/2009 | Botzenhard et al. |
| 2010/0265629 | A1 | 10/2010 | Beckerman |
| 2012/0092811 | A1 | 4/2012 | Chapel et al. |

ACCELERATED MOTION RELAY

CROSS-REFERENCES

This application is a continuation of U.S. patent application Ser. No. 17/397,283 which is entitled "ACCELERATED MOTION RELAY," filed Aug. 9, 2021, which is a continuation of U.S. patent application Ser. No. 16/438,195 which is entitled "ACCELERATED MOTION RELAY," filed Jun. 11, 2019, now U.S. Pat. No. 11,211,216, issued Dec. 28, 2021, which is a continuation of U.S. patent application Ser. No. 15/452,917 which is entitled "ACCELERATED MOTION RELAY," filed Mar. 8, 2017, now U.S. Pat. No. 10,361,050, issued Jul. 23, 2019, which is a continuation of U.S. patent application Ser. No. 14/217,159 which is entitled "ACCELERATED MOTION RELAY," filed Mar. 17, 2014, now U.S. Pat. No. 9,646,789, issued May 9, 2017, that application being a nonprovisional of U.S. Patent Application No. 61/792,738 which is entitled "ACCELERATED MOTION RELAY," filed Mar. 15, 2013. The contents of each of the above applications are incorporated herein by reference as set forth in full and priority from this application is claimed to the full extent allowed by U.S. law. The following applications are incorporated by reference herein, though no priority claim is made:

1) U.S. Patent Application Publication No. US-2012/0181869-A1, published on Jul. 19, 2012, entitled, "PARALLEL REDUNDANT POWER DISTRIBUTION," U.S. patent application Ser. No. 13/208,333, ("the '333 application") filed on Aug. 11, 2011, entitled, "PARALLEL REDUNDANT POWER DISTRIBUTION," which is a nonprovisional of and claims priority from U.S. Provisional Patent Application No. 61/372,752, filed Aug. 11, 2010, entitled "HIGHLY PARALLEL REDUNDANT POWER DISTRIBUTION METHODS," and U.S. Provisional Patent Application No. 61/372,756, filed Aug. 11, 2010, entitled "REDUNDANT POWER DISTRIBUTION,"
2) U.S. Pat. No. 8,004,115 from U.S. patent application Ser. No. 12/569,733, filed Sep. 29, 2009, entitled AUTOMATIC TRANSFER SWITCH MODULE, which, is a continuation-in-part of U.S. patent Ser. No. 12/531,212, filed on Sep. 14, 2009, entitled "AUTOMATIC TRANSFER SWITCH,", which is the U.S. National Stage of PCT Application US2008/57140, filed on Mar. 14, 2008, entitled "AUTOMATIC TRANSFER SWITCH MODULE," which claims priority from U.S. Provisional Application No. 60/894,842, filed on Mar. 14, 2007, entitled "AUTOMATIC TRANSFER SWITCH MODULE;" and
3) U.S. Patent Application Publication No. US-2012-0092811 for U.S. patent application Ser. No. 13/108,824, filed on May 16, 2011, entitled "POWER DISTRIBUTION SYSTEMS AND METHODOLOGY," is a continuation of U.S. patent application Ser. No. 12/891,500, filed on Sep. 27, 2010, entitled, "Power Distribution Methodology which is a continuation-in-part of International Patent Application No. PCT/US2009/038427, filed on Mar. 26, 2009, entitled, "Power Distribution Systems And Methodology," which claims priority from U.S. Provisional Application No. 61/039,716, filed on Mar. 26, 2008, entitled, "Power Distribution Methodology."

FIELD

The present invention relates generally to electrical relays and, in particular, to relay devices used in the distribution of power including such distribution in mission critical equipment used in such environments as medical contexts, the power utility grid or in data center environments. The invention has particular advantages with regard to applications where fast relay response is desirable.

BACKGROUND

Many devices use relays to control electricity. Some use it to turn current on or off, others to switch between different electrical sources, such as in transfer switches. The speed at which these devices can accomplish their function is generally limited by the time the relay takes to move from one position with contacts closed and passing current to the other (or next for multi-position relays, such as rotary relays) position where the contacts are either closed or open, depending on the design and function of the relay. The relay generally is the limiting factor in the device's speed of execution, because the time required to move the relay's contacts is so much slower than the speed of the electronic logic controlling the relay's actuation.

In many applications, the transfer time of the relay, either between on and off or between power sources such as in an Automatic Transfer Switch (ATS) is important. One example is the design and management of power distribution in data centers because the power supplies used in modern Electronic Data Processing (EDP) equipment can often only tolerate very brief power interruptions. For example, the Computer and Business Equipment Manufacturers Association (CBEMA) guidelines used in power supply design recommend a maximum outage of 20 milliseconds or less. There are many other examples of devices incorporating relays, where the speed of relay function is an important issue and faster relay transfer time would be a benefit.

SUMMARY

The present invention relates to improving the transfer time of relays in various contexts including in data center environments. In particular, the invention relates to providing improved transfer time for relays, which can be used in the design of automatic transfer switches (ATS), for switching between two or more power sources (e.g., due to power failures such as outages or power quality issues), as well as other power distribution components. Some of the objectives of the invention include the following:

- Providing methods to improve the transfer time of relays in connection with devices that use relays, for example automatic transfer switches, such that the transfer time of the device incorporating the improved relays is reduced;
- Enabling the use of relays for power transfer even in connection with equipment that can only tolerate short power interruptions, thereby allowing for efficient, reliable, and scalable transfer switch designs;
- Improving the transfer time of a highly redundant, fault-tolerant, scalable, modular parallel switch design methodology that allows a family of automatic transfer switches in needed form factors to be constructed for a variety of auto-switching needs in the data center and other environments.

These objectives and others are addressed in accordance with the present invention by providing various systems, components, and processes for improving relay function. Many aspects of the invention, as discussed below, are applicable in a variety of contexts. However, the invention has particular advantages in connection with data center applications. In this regard, the invention provides considerable flexibility in designing power distribution devices that use relays for use in data center and other environments. The invention is advantageous in designing the devices used in power distribution to server farms such as are used by companies such as Google or Amazon or cloud computing providers.

In accordance with one aspect the present invention, a method is provided for switching electrical power using a relay. The relay includes a moveable electrode structure (e.g., an armature or any other moveable electrode device) and first and second circuit electrodes (e.g., normally open and normally closed contacts). The moveable electrode structure is moveable between a first position, where the moveable electrode structure electrically contacts the first circuit electrode to enable current flow in a first circuit (e.g., depending on the configuration of the first the circuit and state of components on that circuit), and a second position, where the moveable electrode structure electrically contacts the second circuit electrode. The inventive method involves accelerating the moveable electrode structure during a first portion of its travel path between the first and second electrodes and decelerating the moveable electrode structure during a second portion of its travel path between the first and second electrodes.

The acceleration and deceleration are preferably controlled by an electromagnetic drive system but may additionally or alternatively include mechanical elements such as springs or other mechanisms.

Such acceleration and deceleration can be employed to reduce the transfer time between the first and second circuit electrodes and/or to provide a soft landing so as to extent electrode life, reduce bounce, and allow for different material options for the electrodes. In this regard, the moveable electrode structure may be accelerated in an initial portion of the travel path and decelerated in a terminal portion of the travel path. The acceleration and deceleration can be substantially symmetric in relation to a mid-point of the path such that a maximum velocity of the moveable electrode structure occurs at or near the mid-point and velocity drops close to zero at contact landing. A corresponding relay apparatus includes an electromagnetic drive system operative to accelerate and decelerate the moveable electrode structure during transfer.

In accordance with another aspect of the present invention, a relay with bi-directional electromagnetic drive is provided. An electromagnetic drive is provided that is operative to exert a first electromagnetic force on a moveable electrode structure effective to accelerate the moveable electrode structure in a first direction relative to an axis extending between first and second circuit electrodes. The drive is further operative to accelerate the moveable electrode structure in a second direction relative to the axis.

The electromagnetic drive may include drive elements (e.g., an electromagnetic core and windings) on one side or both sides of the gap between the circuit electrodes. One or more of the drive elements may be reversible in polarity, and the drive elements may be operated at the same or different time periods. The drive elements may repel and/or attract the moveable electrode structure. The bi-directional electronic drive may be used to accelerate and decelerate the moveable electrode structure during a single transfer, to allow for bi-directional electromagnetic actuation (e.g., thus reducing and/or eliminating the need for springs or other components), or to allow bi-directional control for any other reason desired. A corresponding method involves operating an electromagnetic drive system to accelerate a moveable electrode structure in a first direction relative to the axis extending between the circuit electrodes and operating the electromagnetic drive system to accelerate the moveable electrode structure in a second direction relative to the axis.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label that distinguishes among the similar components. If only the first reference label is used in the specification, the description is applicable to any one of the similar components having the same first reference label irrespective of the second reference label.

DETAILED DESCRIPTION

A design issue for relays used in electrical power switching, is transfer time of the relay. The contacts are mounted (usually on an armature) so that they can be moved to accomplish their switching function. The contact mass, shape, range of motion, mechanical leverage and force used to move the armature are all relay design issues. The range of motion is dictated by the gap needed between the contacts to minimize arcing at the maximum design current level and voltage rating. As the maximum design current is increased, the gap must also increase. The mass of the contact must be accelerated by the force applied to the armature, which has a practical limit. These factors impose a limit on the amount of current that can be sent through a pair of contacts and still maintain an acceptable transfer time for EDP equipment. EDP equipment CBEMA guidelines recommend a maximum of approximately 20 milliseconds of power outage for continued operation of modern switched power supplies. If the mass of the armature and contact gap are too large, the relay transfer time exceeds this time limit. Traditional techniques in this area were developed from prior industrial electrical practice.

This invention relates to improving the performance of existing electromechanical relays, herein referred to as the "relay". It is an innovation that increases the speed at which the relay can make the transition from one state to the next (for example the de-energized state to the energized state) and back (for example from the energized state to the de-energized state). In addition, the concept also improves the characteristics of a condition commonly referred to as "bounce", that occurs the moment when the contacts within the relay contact each other during either actuation or release. A further benefit of the concept is the improved life expectancy of said contacts by reducing the mechanical deformation of said contacts from repeated impacts with each other. An additional potential benefit is reduced arcing, which can also improve contact life and function (by avoiding degradation) plus reducing the potential for "arc welding" of contacts, which can be a catastrophic failure mode.

Figure 1:
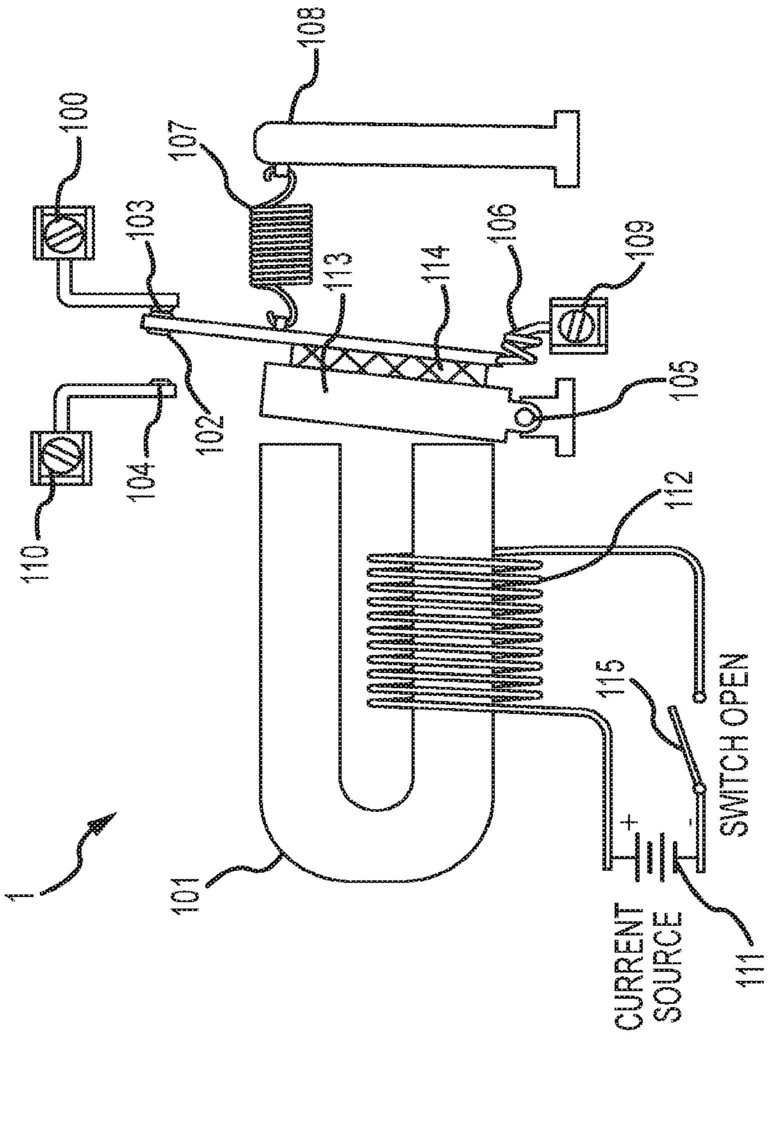
FIG. 1 shows an example of a typical general purpose relay in the non-energized (open) state.

A generic relay is outlined in FIG. 1. Various trade names are associated with the components of this relay, but for clarity, names given here will be generic.

Turning to FIG. 1, The primary components of the relay (1) are the magnetic core (101), the electromagnetic coil (112), the armature (113), the return spring (107) and the electrical contacts and connection elements (100, 102, 103, 104106, 109 110). Shown also is a potential electric current source—a battery (111), and a switch (115) to turn on and off the supply of current to the coil. The switch is representative as is the battery, the switch could be a semiconductor, another relay, or any other means desired. Also shown on this relay (1) is the pivot point (105) that the armature moves about, and an insulator between the metal armature (113) and the electrical path between the moving contact (102) and the flex point (106). This relay (1) is shown in the non-energized state.

Figure 2:
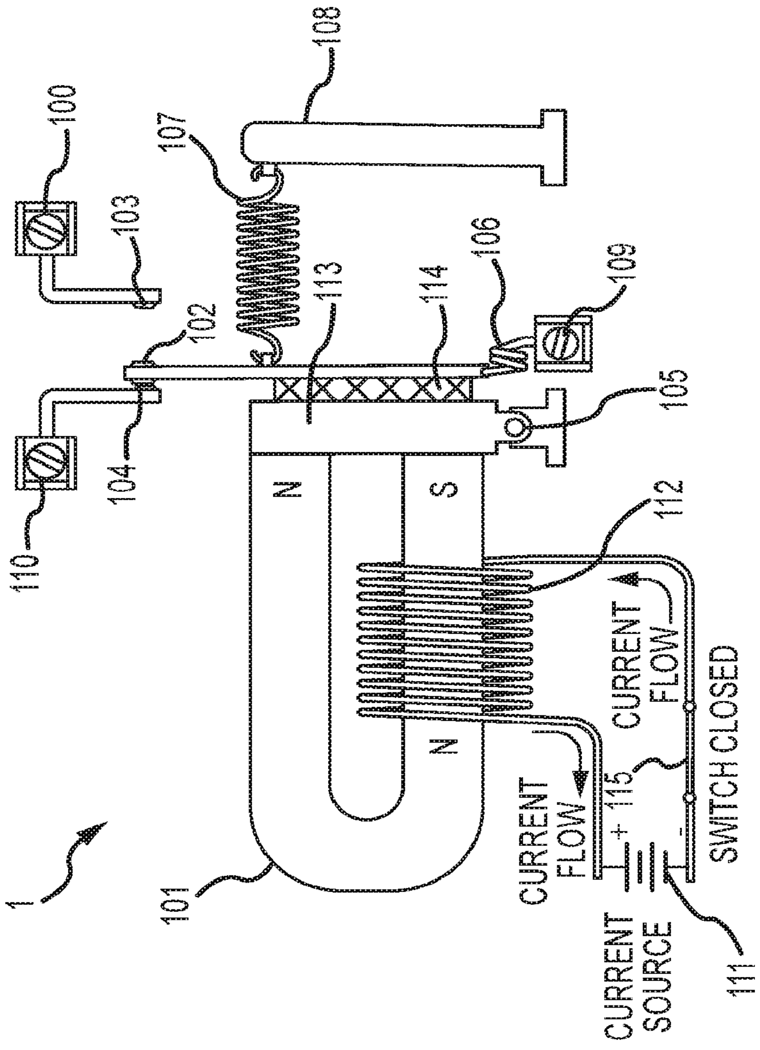
FIG. 2 shows an example of a typical general purpose relay in the energized (closed) state.

FIG. 2 represents the relay (1) in the energized state, or where current from the battery (111) is being delivered to the coil (112) via the switch (115) closure. The resultant magnetic field buildup in the core (101) attracts the armature (113), stretches the spring (107) against its mounting point (108), which in turn moves the moving contact (102) called the common, or C, away from the stationary normally closed, or NC, contact (103) and towards and landing upon the normally open, or NO, contact (104). Current could now flow from the common terminal (109) to the NO terminal (110). This is the standard and most commonly applied configuration for general purpose electromagnetic relays, and will be used as the example application of the invention claimed here.

Characteristics associated with the example relay that are of interest to this invention are the magnetic and mechanical effects relevant to the design and construction of the relay. The principal consideration is controlling the velocity of the armature relative to the core. In the design of relays as depicted here, the armature is attracted to the core by the magnetic flux introduced into the core by the coil upon energization. This is not generally controlled. Rather, the maximum sustainable current is simply applied to the coil and the force applied to the armature is dictated by that static field. The resultant motion of the contacts is controlled by that force applied to the mass of the armature (including contacts) and the mechanical design of the armature and linkages which determine the leverage that force is applied through. Upon removal of electrical current, the field collapses and the attraction between the armature and the core no longer exists. The spring then pulls the armature away from the core and in turn changes the position of the movable contact with respect to the other contact(s). It should be noted that numerous contact arrangements are possible, but all contact arrangements depend on the position of the movable contact(s).

The method of driving the relay coil(s) described below allows the armature to be acted upon in a dynamic and controlled fashion that allows the motion of the armature to be optimized for the intended purpose. Adding an additional coil, or "splitting" the existing coil, allows for cost-effective manufacture of these general purpose relays by existing means, but most importantly allows for a high degree of control over the motion of the armature. Note that in the examples that follow, two coils are shown, however as noted above, it is also possible and may be advantageous to use one coil with multiple windings. Also, it may be advantageous to use one or more cores and one or more windings in various configurations and geometries. By changing how the coil is arranged, and driving the coils from a controlled electronic source that can dynamically change the current in the coils, the motion of the armature can be accelerated nearly to its theoretical limits, and then de-accelerated just prior to the contacts landing to provide a soft landing, and hence minimize bounce.

This technique is something we call "Rocket Relay,™" because the physics involved are similar to those involved in rockets. Bounce is the inevitable reaction of the two metallic surfaces of the contacts hitting each other at significant velocity and the various elastomeric and flexure elements interacting to produce two or more contact events to occur upon the landing cycle.

Resonance and mass, materials selected, and numerous other factors contribute to the bounce. A great deal of effort has been put into reducing the bounce via mechanical means and is not a focus of discussion here. The principal concept that this patent addresses is the ability to control the velocity and motion of the armature, and hence the movable contact, such that it can move from one position to the other with optimum speed and minimum bounce. In this example, it is done via control of the electromotive force. Controlling the electromotive force can be used to advantage in other electro-mechanical devices where accelerated, controlled motion(s) would be of benefit. Also note that other means could be also used to apply controlled forces to move the contacts in an accelerated, controlled fashion distinct from application of a simple force.

Figure 3:
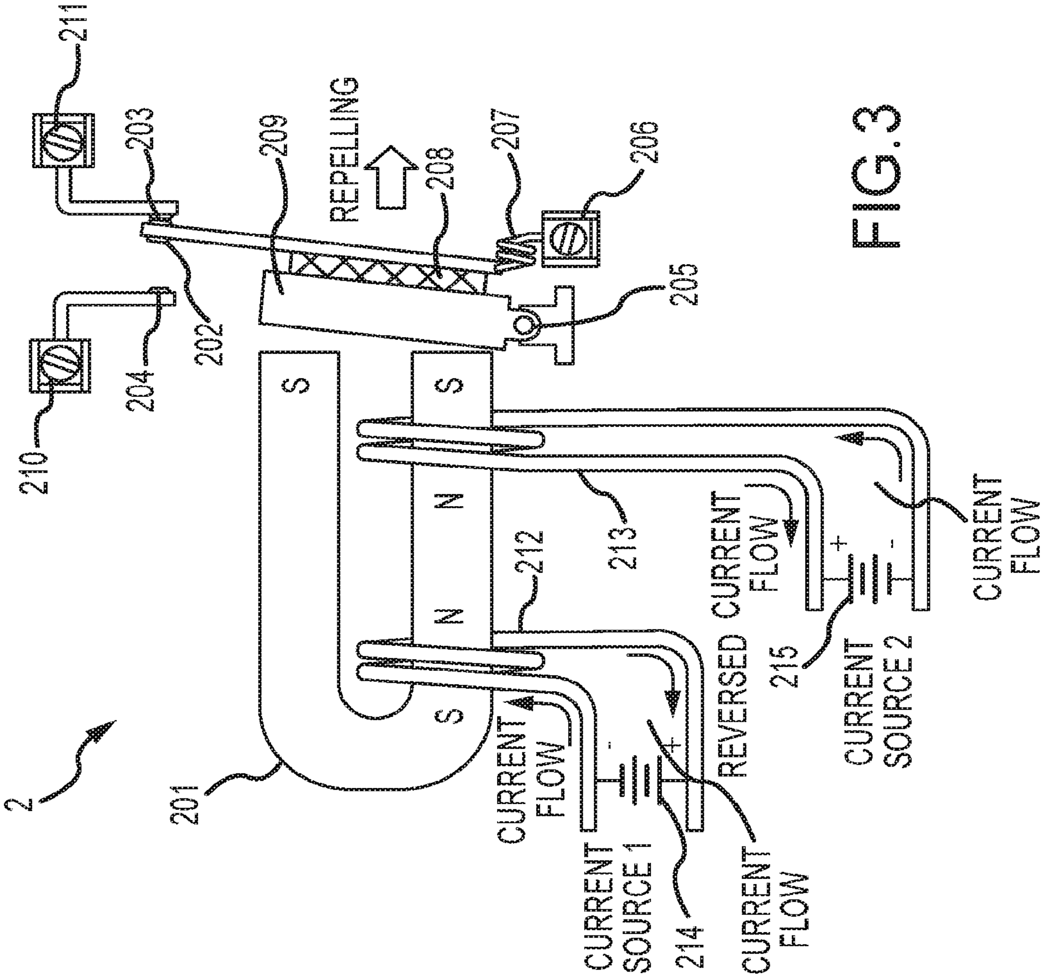
FIG. 3 shows an example of a relay in accordance with the present invention, in the open state.
Figure 4:
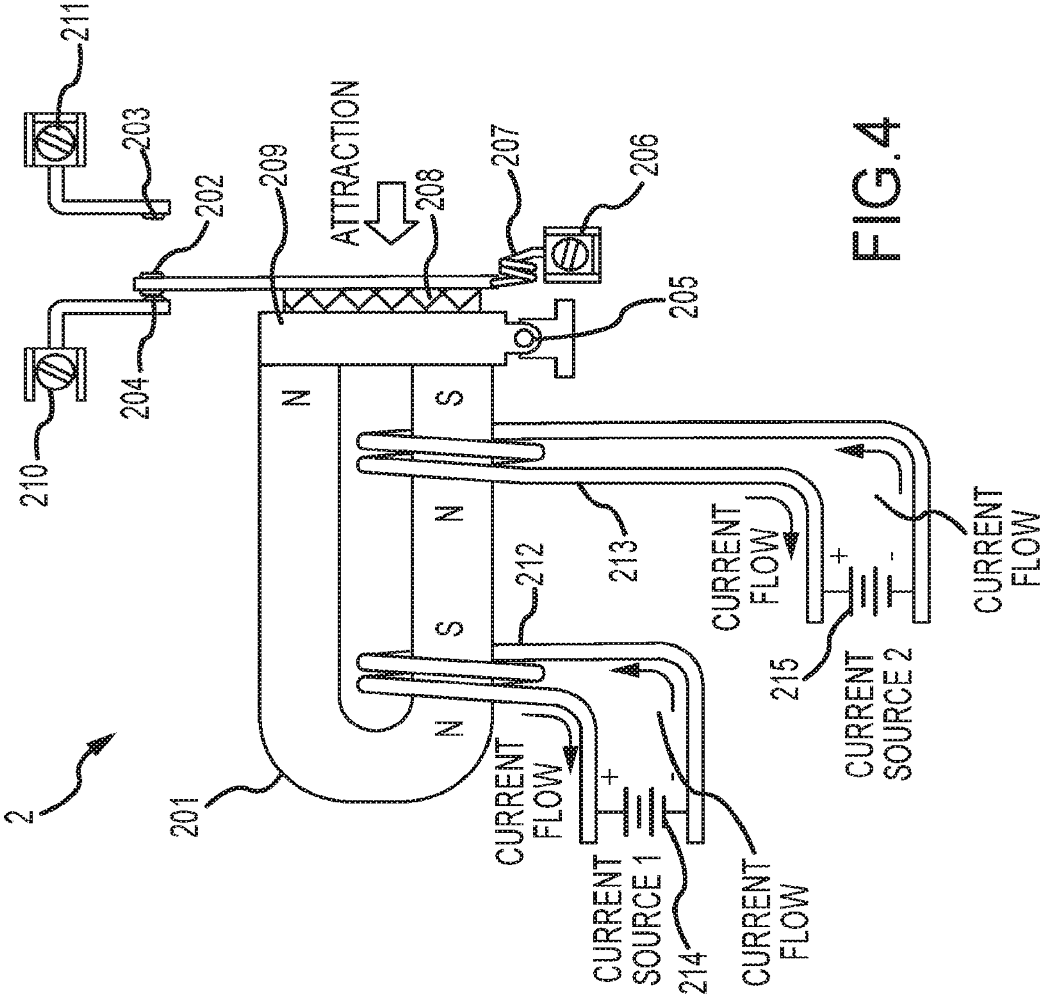
FIG. 4 shows an example of a relay in accordance with the present invention, in the closed state.

To achieve this dynamic capability, a means of applying a force in either direction on the armature is required. In this example the electromotive force can act to both pull the armature and repel it as required. The concept introduced here provides that capability utilizing the existing general mechanical construct of the example general purpose relays. FIG. 3 and FIG. 4 show how the invention can be incorporated into the relays described in FIG. 1 and FIG. 2.

The first example of the invention shown in FIG. 3 uses a relay (2) similar in construction to the generic relay mechanism described in FIG. 1, with the notable change of the addition of a second coil (213) in addition to the original coil (212), and the lack of a return spring and mounting point for that spring. In addition, an additional current source is shown as a battery (215) delivering current to the second coil (213) in one direction as shown. Simultaneously, current is being supplied to the other coil (212) in the opposite direction. This is a fundamental concept of the invention. This counter-delivery of current to two coils results in magnetic fields that oppose each other at the space between the coils, while simultaneously delivering a counter opposing force at each end of the core (201). This counter force causes flux to enter the armature at the pivot point nearest the core (201) and produce a strong repelling effect at the other end of the armature with respect to the field present there. Use of north N, and south S designations help to illustrate the effect. Much like trying to push two magnets of the same polarity orientation together, this field condition presented here causes the armature to be repelled, and the need for a return spring is eliminated. More important than the elimination of the spring, is the fact that bi-directional control of the armature is now possible from solely electronic means if desired.

FIG. 4 represents the same relay (2) now in what would be traditionally referred to as the energized condition. In this case, current to the second coil (213) remains the same as in the complement case, but the current delivered to the first coil (212) is now reversed from the preceding case by reversing the current from the source battery (214). At this time, both coils are conducting current in the same direction and hence the two magnetic fields add together and result in opposite polarities of flux appearing at the ends of the core (201). This state causes the armature (209) to be attracted towards the core (201) and change the position of the contacts as described earlier.

The principal difference when actuating the relay in this mode is that as the armature nears completion of the transition from one position to the other, the current delivered to either coil (212, 213) can be rapidly reversed in one or more impulses or by a pre-specified amount to deliver exactly the amount of counter force needed to the armature as described in the previous state description of FIG. 3. This counter-force can be calibrated or controlled such that the armature is de-accelerated prior to contact of physical material of either the core or the contacts. Upon completing the motion, the contacts are in contact, and a small current can be maintained to either one or both of the coils (212, 213) as needed to hold the contacts in place.

The timing, amount and control of the electrical currents applied to the coils and resultant net force placed on the armature can be optimized to minimize the transfer time of the relay as is further detailed below or provide for any desired transfer time, e.g., in any application where a particular transfer time is desired, within practical limits, that transfer time can be "programmed" into the device by appropriate selection of values for the noted parameters. For certain critical equipment environments, such as transfer switches for EDP equipment, the contact gap is sufficient to avoid arcing in such environments and the transfer is sufficiently short that it can be tolerated by such equipment. For example, in the case of 120 v, 15 A power (e.g., in a U.S. data center), the contact gap may be at least 1.5 mm and the transfer time may be less than 20 milliseconds, for example, no more than about 8 milliseconds. The required gap will vary depending on the voltage and current that needs to be supported. For certain applications, such as relays to perform switching at zero crossings of the power signal (e.g., for cycle stealing), the transfer time is preferable much shorter than 8 milliseconds. It should be noted that the control of the timing and motion of the contacts can be used to optimize the durability of the relay. The motion of the contacts can be controlled so that they separate on or near a zero voltage crossing (for AC current) which minimizes arcing damage to the contacts and land in a controlled fashion with minimum bounce on or near the next zero voltage crossing, which again minimizes arcing damage to the contacts. This technique sacrifices some transfer time speed for maximum durability, which may be worthwhile in some applications. Such a relay would outlast traditional relays due to minimum contact bounce and minimized contactarcing.

Various material and mechanical optimizations can be made to the relay utilizing this method of moving the armature. Although the methods described apply to relays constructed with traditional materials and components, with the resulting considerable improvement in performance (in this example transfer time, contact bounce and durability) the use of the dual coil drive allows additional refinements. Of particular note is the desire to reduce the mass of the moving component, the armature and the attached current carrying components. This allows higher acceleration and de-acceleration rates to be achieved, further reducing transfer times. The material the contact is constructed from can be selected to be a higher electrically conductive material, for example gold. Heretofore, contacts, if made of gold, although possessing much greater current carrying potential per unit mass, would deteriorate due to the mechanical stresses (and resulting deformations, since gold is a soft material, mechanically speaking) induced by uncontrolled landing of the contacts upon each other. With the dual coil method of driving the armature, the impact forces and resulting contact deformation are reduced and/or minimized, thus allowing the use of gold for the contact itself, thus enabling a reduction of the total moving mass.

The material the core and the armature are constructed of can also be improved. Using the ability to closely control the application of current to each of the coils means that much higher initial current levels can be applied, and counter-motion coil currents can also be of a much higher level than normally associated with traditional relays. In this regard, the total amount of flux density per unit mass can thus also be increased. To accomplish this, higher permeability metals such as Hypersill™ silicone iron, or other types of super alloys, even some types of ferrites can be utilized. Again, the characteristic of soft landing enables the use of a ferrite armature without concern for fracturing the brittle material when the armature closes on the core. The armature can be designed to utilize the best magnetic materials with much less concern for their mechanical properties and also profit by the fact that the relay can be designed to more uniformly apply the electromagnetic force to the entire armature (compare this to an armature that is actuated via a spring for example), again reducing the need for mechanical strength in the armature. The location, shape and geometry of the: coils, magnetic core or cores (these examples show one core, multiple cores and/or specially shaped cores with one or more windings can be used to advantage), contacts and magnetic materials in the armature may also be optimized to produce the desired force upon the armature.

It may be possible to further optimize the armature by using very light materials, for example carbon fiber, in combination with controlled placement of suitable magnetic materials, to further reduce transfer times. An example of this technique would be an armature with ferrite elements that was then wrapped in carbon fiber to make an assembly. Other components could be incorporated, for example low-friction bushings on the pivots. In any case, the use of higher flux density materials in the core and the armature allow further reductions in the total moving mass by allowing them to have smaller cross section for the amount of magnetic attraction or repelling required. Conversely, a higher cost might be associated with the more permeable materials, but the cost would be small in comparison to the increase in performance. Acceleration of the armature is a function of the electromotive force that can be applied divided by the mass. Thus, if a higher electromotive force can be imposed because the material can sustain a higher flux density, for the same mass, the acceleration can be greater.

Detailed Description of Operation and Electrical Current Supply for the Accelerated Armature Relay.

The relay modifications described here for improved performance depend on the ability to supply drive currents optimized to produce the desired improvements in relay performance, which also enable improvements in its mechanical properties for the desired applications. Since this design is dependent on having some electronic means to deliver those currents, the coils located inside of the relay can be optimized to perform with those circuits independent of the input drive voltage from the source that delivers the signal to the relay to change state. In a traditional relay, that source might be, as an example, a 24 Volt DC signal. When the 24 VDC is applied in a traditional relay, the coil becomes energized directly from the current available from that 24 volts, then the relay coil must sustain the magnetic force to hold it in the energized state as long as the supply of 24 VDC is present. Upon removing the 24 VDC, the traditional relay will simply lose magnetic field holding the armature in place, and the spring would supply the return force for the armature.

In the accelerated armature method, all of the coil energy is delivered to the armature, and none to the spring, since no spring is needed. Thus, an additional increase in performance is realized from this characteristic as well.

In addition, a coil of a traditional relay must have many turns of wire to provide sufficient resistance to not overheat the coil when in continuously actuated mode. The many turns of wire around the ferromagnetic core produce very significant levels of Inductance. Inductance in series with a high speed transition from non-conducting to conducting is a limiting factor in how fast the ferromagnetic core, and armature can have a field build. Since one of the goals of this invention is to speed up the relay, e.g., reduce flight time, increasing the rate at which the magnetic field can build is desirable. To achieve this, the electrical characteristics of the coils in the accelerated armature relay should have reduced inductance. This is achieved by fewer turns of wire. As the number of turns of wire is reduced, so also is the inductance. Thus, faster capability to introduce magnetic flux is achieved.

Observing FIGS. 1 and 2, the traditional relay (1) has a coil (112) of many turns. The coils drawn are representative, not literal, as the actual number of turns on a traditional coil often is many thousands of turns. However, observing FIGS. 3 and 4, the coils (212, 213) are shown having few turns. This also is representative, but the actual turns could be as few as 10 turns, possibly even less for low voltage relay configurations. This is because the capability to function with very short bursts of relatively high current will work with such low-turn count coils, as it will not be there for more than the duration of the flight time of the armature. Then, either a low-steady state current or an occasional pulse is necessary to hold the relay in one state or another. When a pulse is used, the magnetic energy held in the ferromagnetic material sustains the attractionor repelling forces between those pulses.

The frequency, duration and amplitude of the pulses can vary quite a bit with the design and size of the relay, because these dictate how much magnetic energy the core(s) can hold. However, these variables will be chosen to ensure that the contacts are held in the desired state with at least a reduced and/or minimum desired pressure to ensure proper contact function. This is another advantage to the accelerated armature design of this invention. Only the amount of power needed to hold the armature in place may be used and/or is required. Since no spring, or a minimal spring sufficient to hold the contacts together is present (a design option that eliminates the need for a steady state or pulsed current to hold the contacts together in one state (open or closed), the magnetic force needed to hold the relay in one or both states is optimized to be minimized, because it is not constantly working against the counterforce of a strong spring (designed to move the armature from one state to another in the desired timeframe in a traditional relay). Thus, the benefit is an overall reduction of power consumption in an actuated relay state.

Figure 5A:
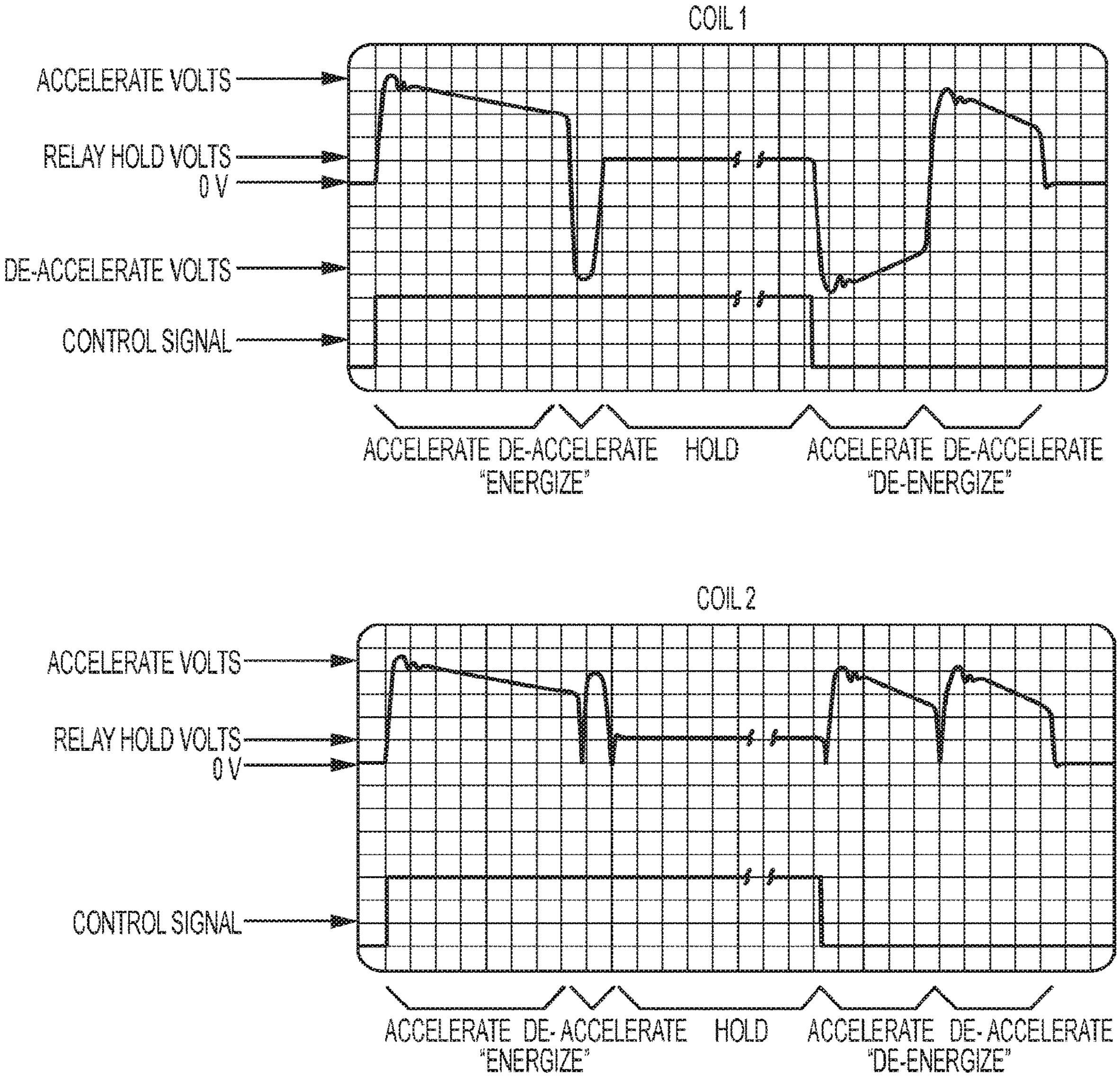
FIG. 5*a* shows a synchogram of the basic operation sequence associated with a full energize to de-energized cycle, in accordance with the present invention.

As described earlier, current must be supplied to at least one of the coils in a reversible fashion. It may also be pulsed, rather than continuous. Many methods are possible for supplying the current, most are traditional electronic design methods. The most direct approach is to have an analog based circuit that delivers a single pulse of sufficient voltage and current for each of the phases of the sequence for opening or closing the armature. FIG. 5*a* represents the basic necessary states of drive in time/voltage (oscilloscope mode), hereafter referred to as synchogram, and a simple example driving circuit that could create this set of conditions in FIG. 5*b*.

FIG. 5*a* shows a synchogram of the basic operation sequence associated with a full energize to de-energized cycle. At the beginning of the cycle, the control input signal changes state to the "energize relay" condition, either a voltage or current application, much the same as a traditional electro-mechanical relay would experience. At the initiating edge of the control signal, coil 1 and coil 2 are delivered a relatively high energy pulse that is in phase with each other that produces a strong attractive magnetic field to the armature. This initiates the acceleration stage during the energize portion of the cycle. After a short period, the armature is in motion and approaching the closure point with the contact and the core. Shortly before the contacts mate and the armature reaches the core, coil 1 is delivered another relatively high energy pulse that is now reversed in its field direction. This reverses the field polarity of coil 1, but because coil 2 is connected to the driver via a bridge rectifier, the coil 2 is delivered the same polarity as in the first stage of operation. The reversed field on coil 1 now forces the ends of the core to both experience same polarity of flux, thus strongly repelling the fast approaching armature. Since at this time the armature is getting nearer and nearer to the core, the field density is increasing also, and a very short duration reverse polarity is needed to rapidly de-accelerate the armature. By tuning the amplitude and duration of this pulse, the armature, and more importantly the moving contact can be smoothly de-accelerated to zero velocity just as the moving contact touches the fixed NO contact. This will nearly eliminate any "bounce" of the contacts. The next stage of the drive is called "Hold". Since the contacts are now touching, a current must be applied to the coil(s) to hold the contacts together securely. Since no springs are involved, a small current is applied to the coils to maintain the contact pressure. Either a small continuous current, or a series of very short pulses can be utilized to perform the hold function, as described earlier and shown by example in FIG. 6*a*.

After a period of time it may become desirable to disengage the relay and have it return to the de-energized condition. Upon removing the control signal from the input the process of returning the armature to the NC position is initiated. Upon the falling edge of the control signal, the drive circuit now delivers a relatively high energy pulse of reverse polarity to coil 1, and normal polarity to coil 2. This results in a high common flux polarity, thus repelling strongly the armature. It accelerates away from the core to near midpoint, whereupon the coil 1 is reversed in its polarity. This needs to be done near midpoint, as the gap formed now between the armature and the core is now increased to a point where the relative flux coupling is decreasing exponentially, and thus the reversal of polarity must occur sooner than in the energize state in order to provide sufficient de-acceleration of the armature to allow the moving contact (attached to the armature) to de-accelerate to almost zero velocity at the time it touches the NC contact of the relay. In some configurations of relays, such as those without electrical contact in the Normally Open (NO) position, the early braking may not be necessary.

Upon completion of the de-acceleration stage, all currents fall to zero if no electrical contact is necessary in the de-energized condition, or a small current can be delivered at this time also to provide contact pressure if electrical connection through the contacts is desired.

Figure 5B:
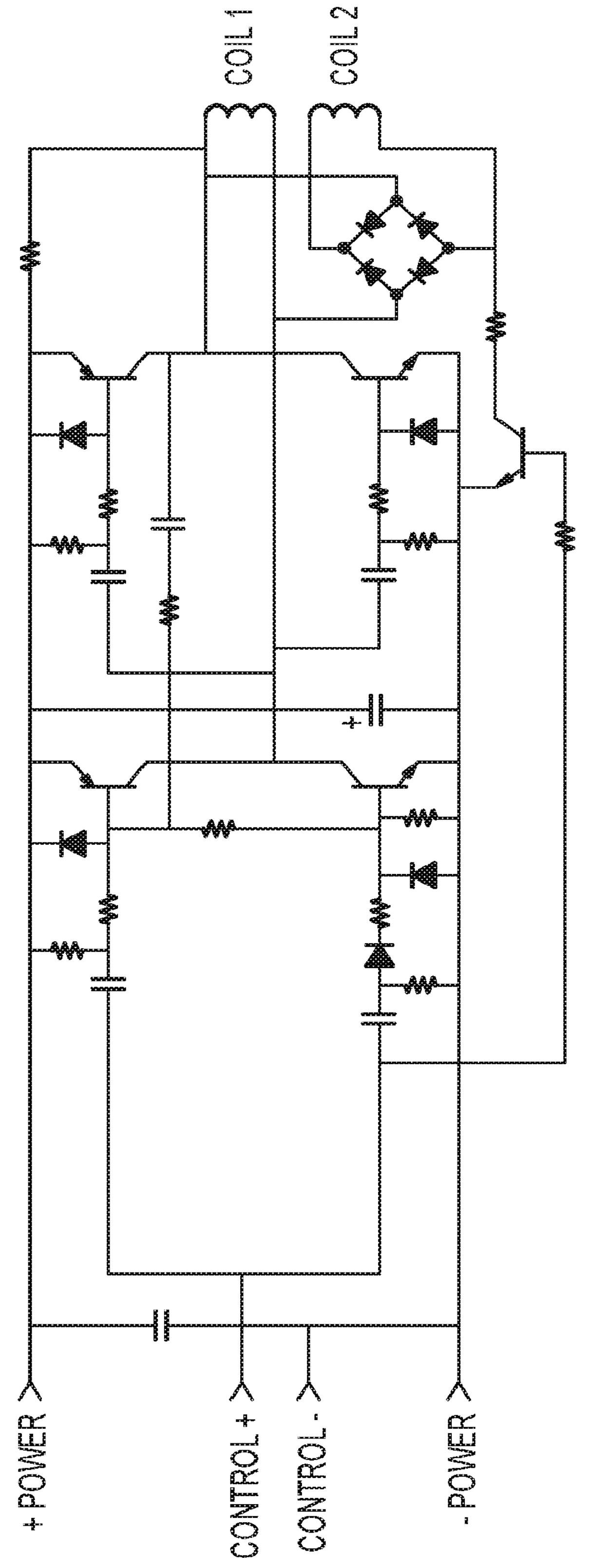
FIG. 5*b* shows a configuration of electrical components for an all-analog drive circuit to accomplish the stages of operation described in FIG. 5*a*, in accordance with the present invention.

FIG. 5*b* shows a possible configuration of electrical components for an all-analog drive circuit to accomplish the stages of operation described in FIG. 5*a*. A detailed description of the operation of this circuit is beyond the scope or intent of the invention, but is included to allow those familiar with the art to understand the characteristics of the waveforms shown on the synchogram in FIG. 5*a*.

Figure 6A:
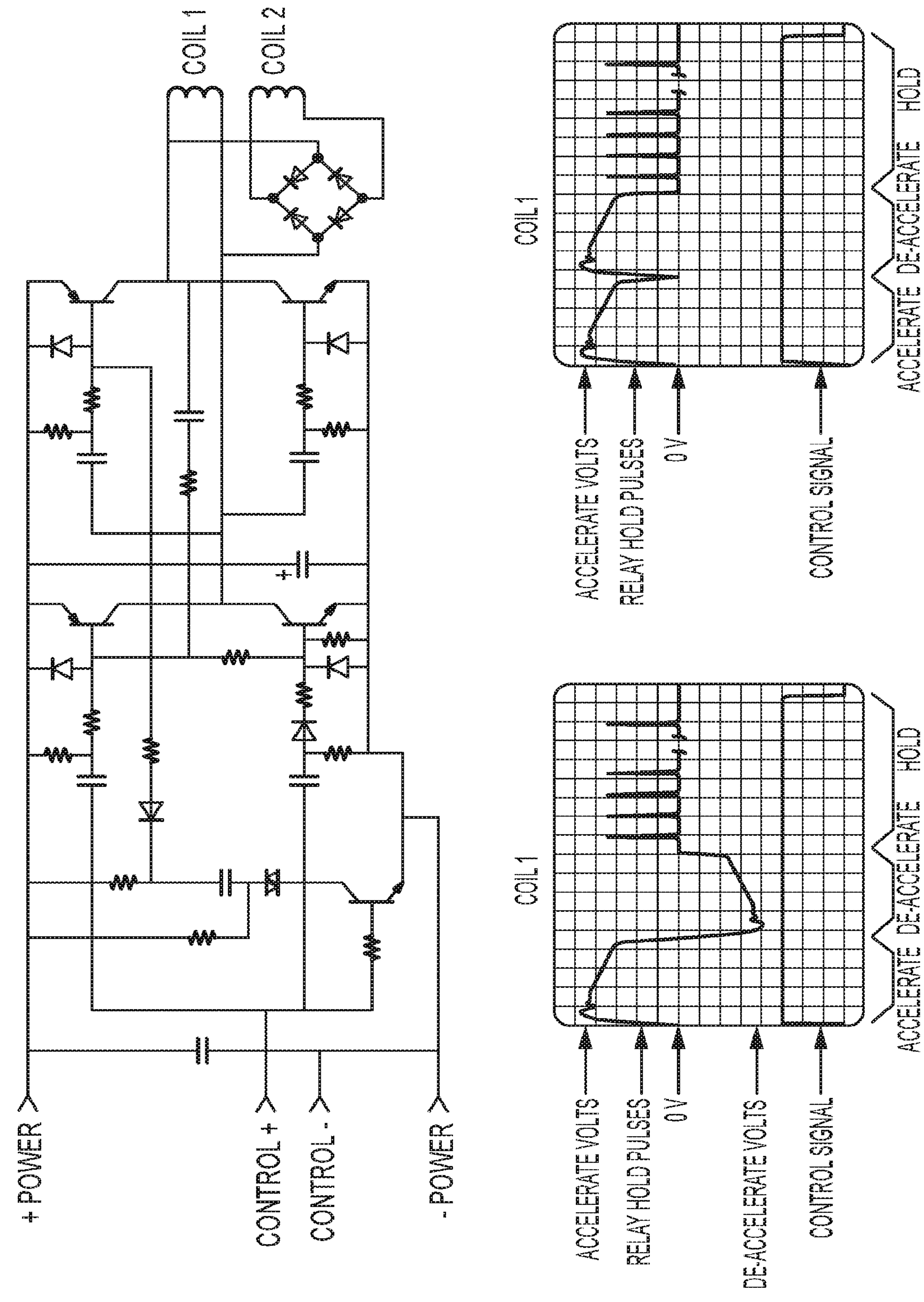
FIG. 6*a* shows an alternative analog drive circuit example that includes pulsed "Hold" current and the relevant synchogram, in accordance with the present invention.

FIG. 6*a* outlines an alternative analog drive circuit example that includes pulsed "Hold" current and the relevant synchogram.

In FIG. 6*a*, an electrical circuit in the driver consisting of a relaxation oscillator formed by a DIAC, and resistor-capacitor, routinely deliver a very short pulse of energy to the coils of the relay to perform the hold function as opposed to a low level constant current. The advantage of this driver design is higher efficiency, lower cost and ease of construction of the coils of the relay. Since all operations are now of very short duration (including the hold, it consists of pulses), the number of turns on the coils may be reduced to the lowest possible number required for insertion of the necessary flux for the duration of the longest pulses. This reduction of number of turns also reduces the Inductance of the coils, thus allowing faster field density changes.

Figure 6B:
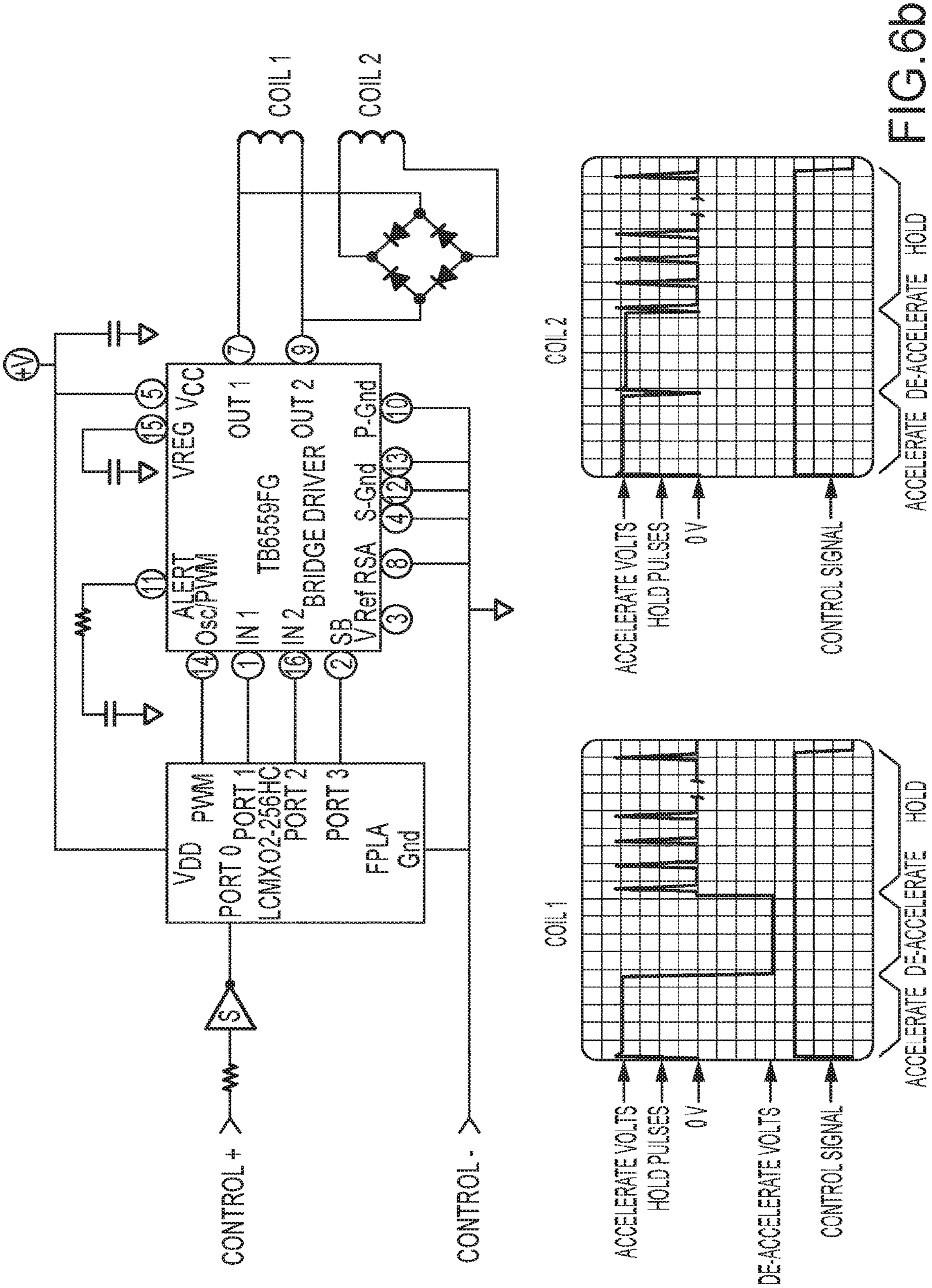
FIG. 6*b* show synchograms that only represent the energization phase, and these are intended to show the similarity to the analog driver stages for the energize half of the complete cycle, in accordance with the present invention.

FIG. 6*b* outlines an alternative possible digital drive circuit example that could be a more cost effective production solution due to the lower parts count, and greater timing and control functionality, including pulsed "Hold" current and asymmetrical accelerate and de-accelerate timing.

In FIG. 6*b*, the synchograms only represent the energization phase, and these are intended to show the similarity to the analog driver stages for the energize half of the complete cycle. A Field Programmable Logic Array (FPLA) is shown as the source of the signaling control for a Bridge Driver that amplifies the signals to drive the coils. Easily, a Programmable Gate Array (PGA) or even a simple microprocessor can be used for the signaling source. In fact, the relay signaling function could be supplied by a remote microprocessor, where the relay drive function is being controlled from in the first place, and the command operations could be a simple peripheral to that processor. Many configurations of how to derive the signaling function can be imagined and/or utilized. In one instantiation, many relays may be operated from one processor or logic array as is described in the "PARALLEL REDUNDANT POWER DISTRIBUTION" application referenced above.

The description of the invention applies as described in the examples given to a traditional general purpose hinged armature relay construction, but the basic concepts apply to numerous other construction types. The following lists some, but not all, alternative relay constructions that this invention can apply to:

1. Linear moving core relay, often described as a "contactor".
2. Rotating cam, commonly used in miniature relays such as so-called "DIP" (dual inline pin, like an integrated circuit).
3. Full rotary, with ball- and ramp.

Figure 7A:
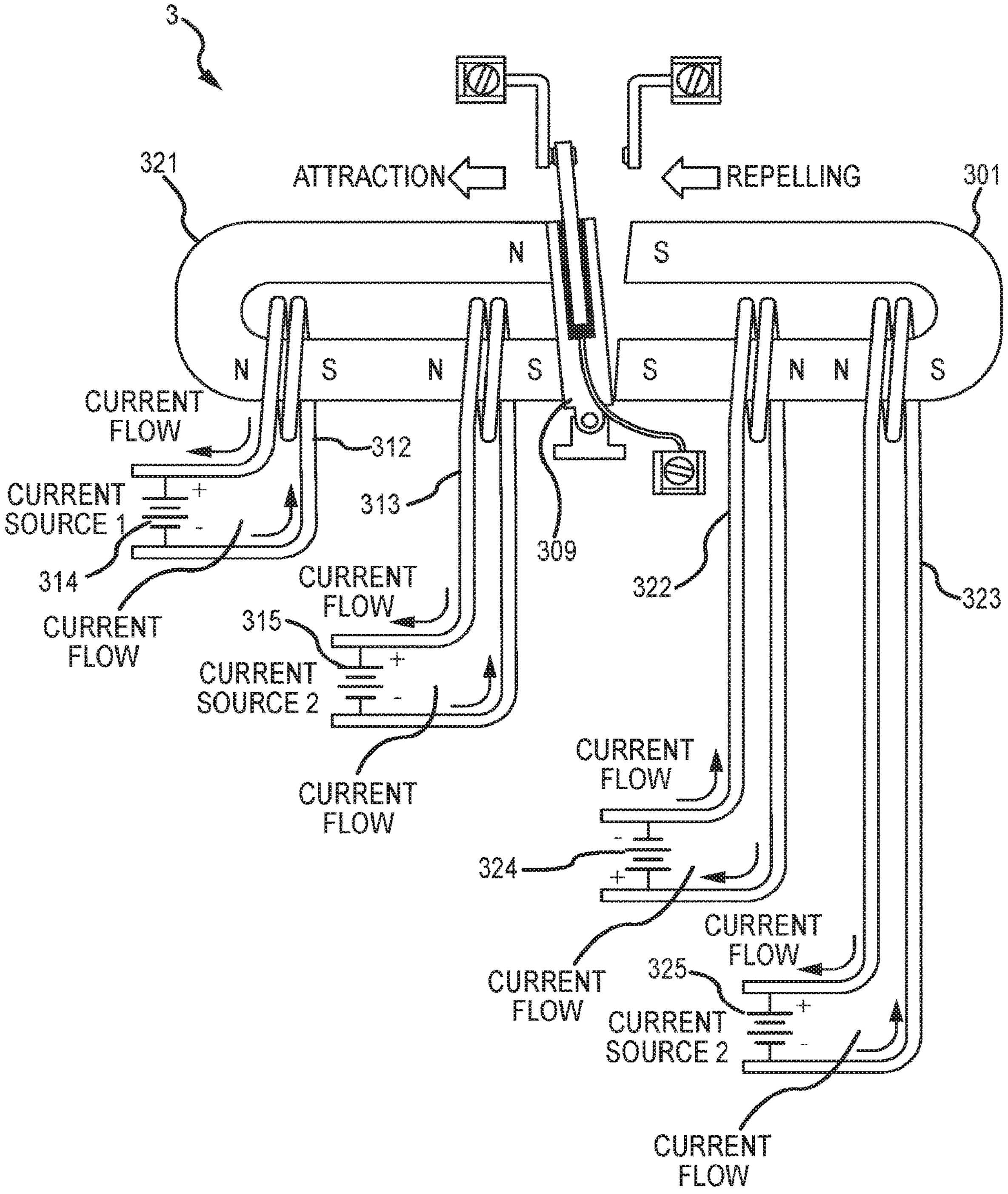
FIG. 7*a* shows an alternative construction in accordance with the present invention.
Figure 7B:
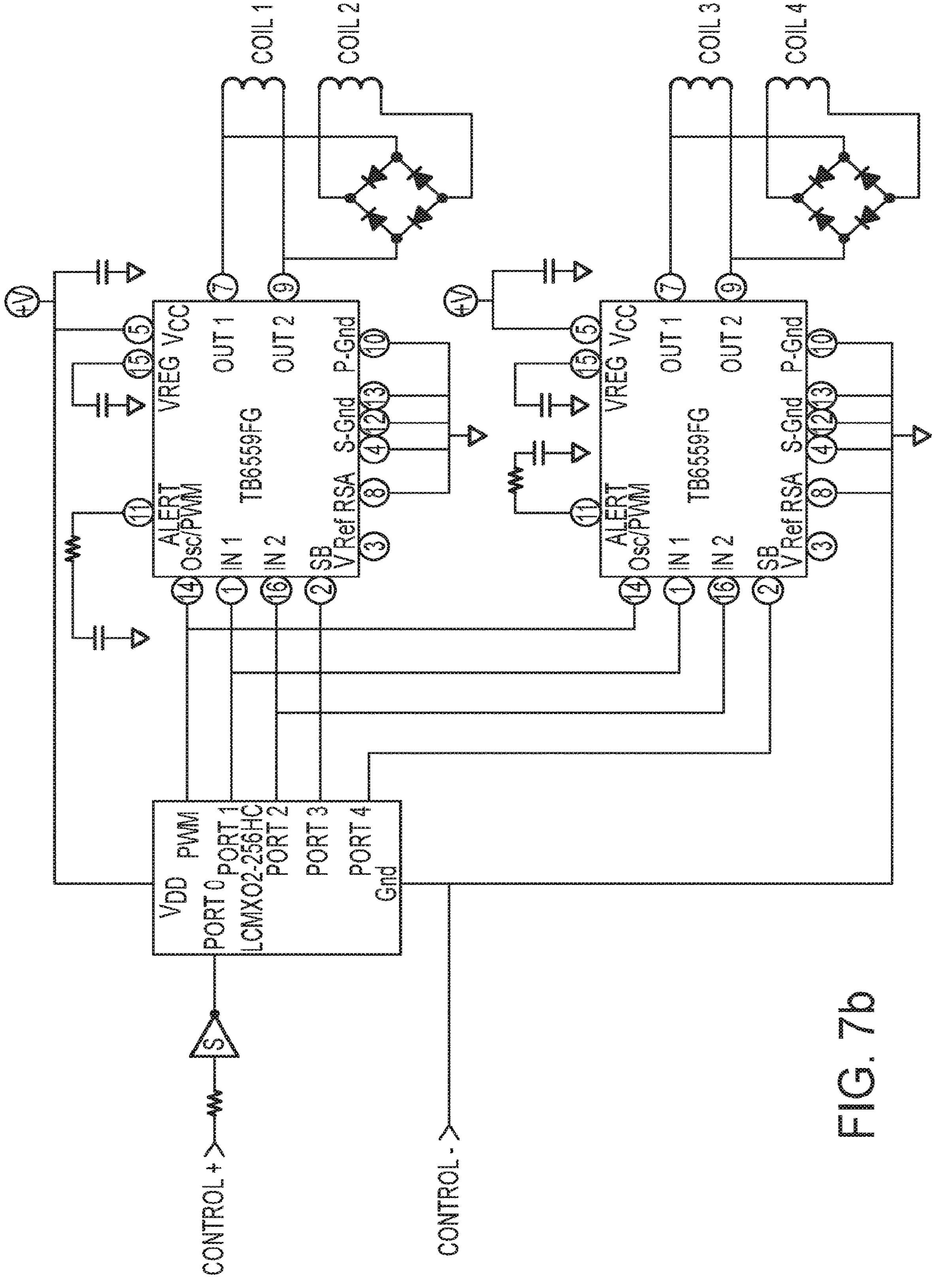
FIG. 7*b* shows a possible driver circuit, in accordance with the present invention.

FIGS. 7*a* and 7*b* represent an alternative assembly of the general purpose relay. It is describing a dual core application utilizing two sets of drivers and dual coils for increasing the speed and improved armature motion control.

Observing FIG. 7*a*, another instantiation of the basic concept is demonstrated. A second core (301), and additional pair of coils (322, 323) has been added to the arrangement previously described, mirrored and placed bi-laterally. In addition, both cores (301, 321) have been angle cut on the mating face with the armature (309) to produce a symmetrical cavity for the armature to travel in. Slight repositioning of armature (309) sub-components such as the insulator and the electrical connections, contacts, etc., have been made to accommodate the bi-symmetrical configuration.

In this instantiation, the features of the dual coil accelerated armature can be further exemplified. With both sets of coils acting upon the armature, advantage can be taken of the initial acceleration of the armature (309) from either position via concentrated common pole flux lines. In the single core instantiation, only on the "energize" half of the cycle could initial acceleration benefit from the concentrated common pole flux lines. These could only be presented as the armature departs from the core, or as it returns, but not at the open phase. In this dual core instantiation, both acceleration, and de-acceleration can take advantage of compressed flux density.

This enables a longer acceleration pulse and shorter de-acceleration pulse, ultimately allowing higher mid-flight velocity. In addition, because as the armature is about to deliver the contacts at the same time it is nearing high flux density compression, the shape of the pulse at that moment can be modified to optimize contact landing, and hold pressure. It is likely that complex waveforms delivered to each of the four coils will be employed to optimize overall performance. This is easily accomplished using the digital control example circuit described in FIG. 7*b*, but with an additional Bridge Driver connected to the FPLA and the second set of coils.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed:

1. A method for use in switching electrical power using a relay, the relay including a moveable electrode structure and first and second circuit electrodes, wherein said moveable electrode structure is moveable from a first position, where said moveable electrode structure electrically contacts said first circuit electrode to enable current flow in a first circuit, and a second position, where said moveable electrode structure electrically contacts said second circuit electrode, said method comprising the steps of, in connection with performing a switching function wherein said moveable electrode structure moves on a path across a space between said first position and said second position;
- accelerating said moveable electrode structure during a first portion of travel of said moveable electrode structure on said path across said space; and
- decelerating said moveable electrode structure during a second portion of travel of said moveable contact structure on said path across said space, wherein:
- at least one of said steps of accelerating and decelerating comprises operating an electromagnetic drive system to exert a force on said moveable electrode structure;
- said electromagnetic drive system exerts a first force on said moveable electrode structure from a first position on a first side of said a space between said first and second circuit electrodes and exerts a second force on said moveable electrode structure from a second position on a second side of said space; and
- said first force and second force are applied in different directions with respect to an axis extending between said first and second circuit electrodes.

2. The method as set forth in claim 1, wherein said moveable electrode structure comprises an armature having at least one contact formed thereon for establishing electrical contact with said first and second circuit electrodes.

3. The method as set forth in claim 1, wherein said electromagnetic drive system exerts force on said moveable electrode structure from a first position on a first side of a space between said first and second circuit electrodes, and said accelerating comprises driving said electromagnetic drive system with current of a first polarity, and said decelerating comprises driving said electromagnetic drive system with current of a second polarity.

4. The method as set forth in claim 1, wherein said first force and second force are applied in the same direction with respect to an axis extending between said first and second circuit electrodes.

5. The method as set forth in claim 1, wherein said step of accelerating occurs during a first half of said travel of said moveable electrode structure on said path across said space and said step of decelerating occurs during a second half of said travel of said moveable electrode structure on said path across said space.

6. The method as set forth in claim 1, wherein said accelerating and decelerating are controlled to be substantially symmetrical with respect to a midpoint of said path across said space.

7. The method as set forth in claim 1, wherein a distance between said first and second circuit electrodes is at least about 1.5 mm and a transit time, for said moveable electrode structure between said first and second positions is no more than 20 milliseconds.

8. The method as set forth in claim 1, further comprising controlling operation of said electromagnetic drive system to provide a selected transit time of said moveable electrode structure between said first and second circuit electrodes.

9. The method as set forth in claim 1, further comprising forming an electrode of said moveable electrode structure from gold.

10. The method as set forth in claim 1, further comprising a circuit reversing a direction of current flow through at least one component of said electromagnetic drive system.

11. A relay for switching electrical power comprising:
- a first circuit electrode of a first electrical circuit;
- a second circuit electrode;
- a moveable electrode structure moveable between a first position, where said moveable electrode structure electrically contacts said first circuit electrode to enable current flow in said first circuit, and a second position, where said moveable electrode structure electrically contacts said second circuit electrode; and
- an electromagnetic drive system operative to accelerate said moveable electrode structure during a first portion of travel of said moveable electrode structure on a path across a space between said first and second positions and to decelerate said moveable electrode structure during a second portion of travel of said moveable electrode structure on said path across said space between said first and second positions, wherein:
  - said electromagnetic drive system exerts a first force on said moveable electrode structure from a first position on a first side of said a space between said first and second circuit electrodes and exerts a second force on said moveable electrode structure from a second position on a second side of said space; and
  - said first force and second force are applied in the different directions with respect to an axis extending between said first and second circuit electrodes.

12. The relay as set forth in claim 11, wherein said moveable electrode structure comprises an armature having at least one contact formed thereon for establishing electrical contact with said first and second circuit electrodes.

13. The relay as set forth in claim 11, wherein said electromagnetic drive system exerts force on said moveable electrode structure from a first position on a first side of a space between said first and second circuit electrodes, and said electromagnetic drive system is operative for accelerating said moveable electrode structure by driving said electromagnetic drive system with current of a first polarity, and for decelerating said moveable electrode structure by driving said electromagnetic drive system with current of a second polarity.

14. The relay as set forth in claim 11, wherein said first force and second force are applied in the same direction with respect to an axis extending between said first and second circuit electrodes.

15. The relay as set forth in claim 11, wherein said electromagnetic drive system is operative for accelerating said moveable electrode structure during a first half of said travel of said moveable electrode structure on said path across said space and decelerating said moveable electrode structure during a second half of said travel of said moveable electrode structure on said path across said space.

16. The relay as set forth in claim 11, further comprising a controller for controlling acceleration and deceleration of said moveable electrode structure to be substantially symmetrical with respect to a midpoint of said path across said space.

17. The relay as set forth in claim 11, wherein a distance between said first and second circuit electrodes is at least about 1.5 mm and a transit time, for said moveable electrode structure between said first and second positions is no more than 20 milliseconds.

18. The relay as set forth in claim 11, further comprising a controller for controlling operation of said electromagnetic drive system to provide a selected transit time of said moveable electrode structure between said first and second circuit electrodes.

19. The relay as set forth in claim 11, wherein an electrode of said moveable electrode structure is formed from gold.

20. The relay as set forth in claim 11, further comprising a circuit for reversing a direction of current flow through at least one component of said electromagnetic drive system.

21. A relay for switching electrical power comprising:

a first circuit electrode of a first electrical circuit:

a second circuit electrode:

a moveable electrode structure moveable between a first position, where said moveable electrode structure electrically contacts said first circuit electrode to enable current flow in said first circuit, and a second position, where said moveable electrode structure electrically contacts said second circuit electrode; and an electromagnetic drive system operative to exert a first electromagnetic force on said moveable electrode structure effective for accelerating said moveable electrode structure in a first direction relative to an axis extending between said first and second circuit electrodes, and to exert a second electromagnetic force on said moveable electromagnetic structure effective for accelerating said moveable electrode structure in a second direction, different from said first direction, relative to said axis.

22. The relay as set forth in claim 21, wherein said moveable electrode structure comprises an armature having at least one contact formed thereon for establishing electrical contacts with said first and second circuit electrodes.

23. The relay as set forth in claim 21, wherein said electromagnetic drive system exerts force on said moveable electrode structure from a first position on a first side of a space between said first and second circuit electrodes, and said electromagnetic drive system is operative for accelerating said moveable electrode structure by driving said electromagnetic drive system with current of a first polarity, and for decelerating said moveable electrode structure by driving said electromagnetic drive system with current of a second polarity.

24. The relay as set forth in claim 21, wherein said electromagnetic drive system exerts a first force on said moveable electrode structure from a first position on a first side of said a space between said first and second circuit electrodes and exerts a second force on said moveable electrode structure from a second position on a second side of said space.

25. The relay as set forth in claim 24, wherein said first force and second force are applied in the same direction with respect to an axis extending between said first and second circuit electrodes.

26. The relay as set forth in claim 24, wherein said first force and second force are applied in the different directions with respect to an axis extending between said first and second circuit electrodes.

27. The relay as set forth in claim 21, wherein said electromagnetic device system is operative for accelerating said moveable electrode structure during a first half of said travel of said moveable electrode structure on said path across said space and decelerating said moveable electrode structure during a second half of said travel of said moveable electrode structure on said path across said space.

28. The relay as set forth in claim 21, further comprising a controller for controlling acceleration and deceleration of said moveable electrode structure to be substantially symmetrical with respect to a midpoint of said path across said space.

29. The relay as set forth in claim 21, wherein said a distance between said first and second circuit electrodes is at least about 1.5 mm and a transit time, for said moveable electrode structure between said first and second positions is no more than 20 milliseconds.

30. The relay as set forth in claim 21, a controller for controlling operation of said electromagnetic drive system to provide a selected transit time of said moveable electrode structure between said first and second circuit electrodes.

31. The relay as set forth in claim 21, wherein an electrode of said moveable electrode structure is formed from gold.

32. The relay as set forth in claim 21, further comprising a circuit for reversing a direction of current flow through at least one component of said electromagnetic drive system.

* * * * *